Figure 1:
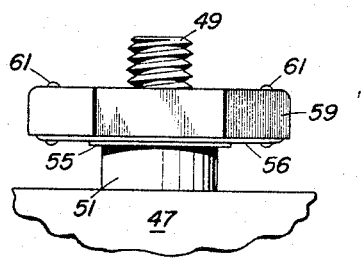

Dec. 6, 1966    N. N. RUBIN    3,289,524
TORQUE LIMITING NUT
Original Filed Feb. 28, 1964

INVENTOR
Norman N. Rubin

BY Claude Funkhouser
ATTORNEY

United States Patent Office 3,289,524
Patented Dec. 6, 1966

3,289,524
TORQUE LIMITING NUT
Norman N. Rubin, 10012 Portland Place,
Silver Spring, Md.
Original application Feb. 28, 1964, Ser. No. 348,917.
Divided and this application Sept. 20, 1965, Ser. No. 488,827
1 Claim. (Cl. 85—61)

This invention which is a division of Ser. No. 348,917, filed February 28, 1964, relates to separable fasteners of the bolt and nut type, and more particularly to a nut designed to have relative linear motion, with a bolt, effected by rotary motion ineffective to produce relative linear motion, upon a predetermined resistance to torque being established.

The invention described herein may be manufactured and used by or for the Government of the United States of America for governmental purposes without the payment of any royalties thereon or therefor.

There are instances where a nut and bolt are used where overtightening of the nut is detrimental to the job to which the separable fastener is applied. An extra turn can weaken the threads and sometimes the entire strain of the fastening is on a single thread which when subjected to an overstrain can rupture and render the fastener useless. There are instances where, due to the nature of the material, such as glass or ceramic material of a fragile nature, the nut should not be tightened after a predetermined resistance is reached. Any further torque will rupture the material and any lesser torque will not insure a complete fastening. While it is true there are wrenches where the torque is measured, any force beyond this measurement results in a non-turning of the nut. However, it is believed that this does not solve the problem as it is notorious that although tools are made to do a particular job, the mechanic will use the tool at hand and the advantages of designing a tool for a particular purpose is wasted. With the design of a nut which could not be tightened beyond a desired resistance to turning the hazard of overtightening could be avoided.

It is an object of the present invention to provide a separable fastener of the nut and bolt type which has relative linear movement between the nut and the bolt upon the application of rotary motion to the nut, which upon a predetermined resistance to turning being reached, further torque applied to the nut will be ineffective to produce further relative linear motion between the nut and bolt.

It is another object of the present invention to provide a separable fastener such as a nut and bolt where the nut is designed so that it may not be overtightened, and that upon a predetermined resistance to turning being reached, any further torque applied will be ineffective to produce any linear movement of the nut relative to the bolt.

It is another object of the present invention to provide a structure which is built into the fastener itself which prevents overtightening.

It is another object of the present invention to provide friction drive means within the body structure of the nut which upon reaching a predetermined load will slip permitting continued turning of the nut without advancement of the nut on the bolt.

It is a further object of the present invention to provide a nut having two separable portions, one of the portions engaging the threads of the bolt and the other of said portions being engaged by a wrench and turning the first portion through some disengageable drive.

It is a further object of the present invention to provide means within the body structure of the nut to permit rotation of the nut without linear movement of the nut relative to the bolt.

It is a further object of the present invention to provide a nut formed with an elongated body made of separated longitudinal segments and to thread a portion of the interior of these segments and to engage the nut with means to spread the segments to prevent cooperation of the threads of the bolt with those of the nut.

It is a further object of the present invention to provide a separable fastener having a bolt and a nut with the nut being of two parts, one of the parts engaging the threads of the bolt and the other of said parts being used to turn the bolt engaging nut with a disengaging drive means between the two sections of the nut so that when a predetermined resistance to turning is reached one of the sections of the nut may be rotated without imparting rotation to the other section.

A still further object of the invention is to provide nut adapted to be threaded onto a bolt, the nut being formed with annular teeth which are to be engaged by spring means so that the pressure exerted by the spring means on the face of one or more of the teeth provides the torque for tightening the nut on the bolt.

A still further object of the present invention is to provide replaceable spring means which may be used to turn a nut onto a bolt, the resiliency of the spring determining the degree of tightness to which the nut may be turned, the springs being replaceable with other springs of different resiliency to determine the torque which may be transferred in applying the nut to the bolt.

Figure 2:
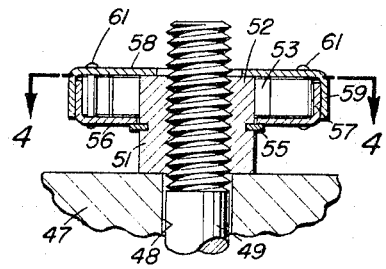
Figure 3:
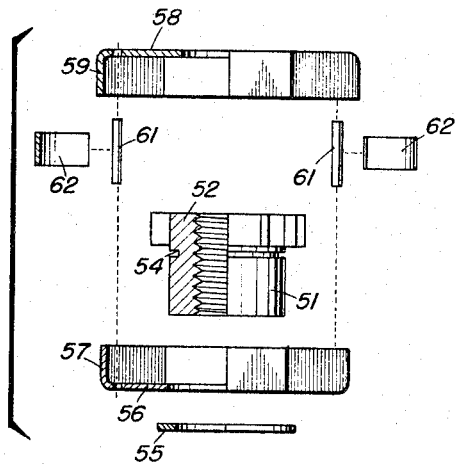
Figure 4:
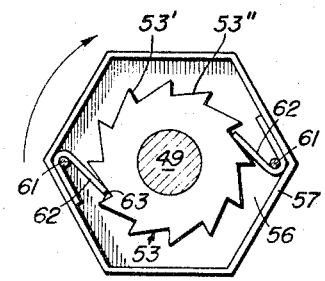
Figure 6:
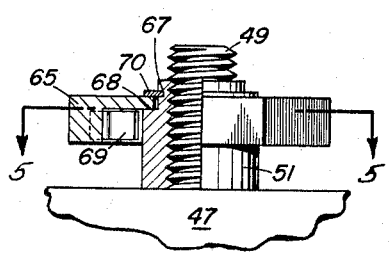
Figure 5:
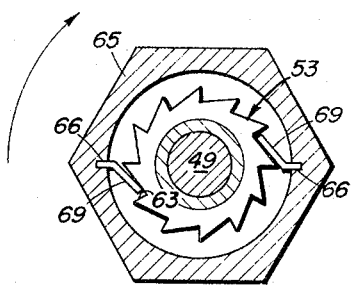

FIG. 1 is a front elevation of a separable fastener;
FIG. 2 is a cross-sectional view of the fastener shown in FIG. 1;
FIG. 3 is an exploded view partly in section of the fastener shown in FIG. 1;
FIG. 4 is a top view taken on line 4—4 of FIG. 2;
FIG. 5 is a view similar to that of FIG. 4 of a modified form of the fastener shown in FIG. 1;
FIG. 6 is a front view partly in section of the modified form shown in FIG. 5.

Some structure 47 to be secured has a hole 48 through which a bolt 49 is passed. An interiorly threaded nut 51 is threaded on the bolt and is formed with an enlarged head 52 which has on its periphery a plurality of saw teeth 53 each formed with a radial face 53' and an angled face 53". Immediately below the head 52 an annular recess 54 houses a retaining ring 55.

A housing formed of a bottom member 56 having an upturned rim 57 and a top cover 58 having a depending rim 59 has its bottom member contacting the retaining ring 55 and the top cover in engagement with the head of the nut. The bottom and top of the housing are secured together by a pair of pins 61 which are upset after protruding through the top and bottom. These pins 61 are located on a diametrical line and in opposite corners of the hexagonal housing. They serve as retaining pins for spring members 62. This housing is removably supported on the nut.

Carried between the respective pins and the upturned rim of the bottom the pair of spring members 62 are of substantially U-shaped form. One leg of the U-shaped member lies along the rim of the bottom member of the housing and the other leg extends into the path of rotation of the teeth. The leg extending into the path of rotation of the nut abuts the radial face of a tooth at the juncture of any two teeth, and lies at an angle with the diametric line, on which the pins are located, which is less than the angle the face of a tooth makes with this diametrical line. The length of this leg, upon turning of the hexagonal housing in a direction to thread the nut onto the bolt, is brought into frictional contact with the angled face of a tooth. Through this frictional contact the nut is turned until the torque required to turn the hexagonal housing becomes greater than that force exerted by the frictional contact between the leg of the spring member and the angled face of a tooth. At this time the leg of the spring member will slide over the angled faces of the teeth and further turning of the hexagonal housing will not produce rotation of the nut. The nut is therefore tightened only to a predetermined torque.

In removing the nut, the hexagonal housing is turned in the opposite direction, and the leg of the spring member is forced against the radial face of a tooth. This is a positive engagement and should turn the nut. There could be a tendency of the spring member to bulge due to the force exerted and this bulging will result in the length of the leg being brought into contact with the angled face of a tooth, which will support the leg of the spring member and resist any buckling of the leg under the force necessary to loosen the nut.

FIGS. 5 and 6 show substantially the same construction with a change in the structure of the housing. In the modified form the housing 65 is of one-piece construction with radial slots 66 in the inner wall. A fin or blade 69 is inserted in the slots and extends to engage the teeth in the manner of the leg of the U-shaped spring member. The nut in the modified form extends above the housing 65 and is formed with an annular recess 67 and an annular shoulder 68. The housing rests on the shoulder and is retained by a ring 70 seated in recess 67.

Obviously many modifications and variations of the present invention are possible in the light of the above teachings. It is therefore to be understood that within the scope of the appended claim, the invention may be practiced otherwise than as specifically described.

What is claimed is:

A separable fastener comprising:
a threaded bolt;
a substantially cylindrical interiorly threaded nut formed with an enlarged head and an annular exterior recess adjacent said head;
teeth integral with and exteriorly of said head, each of said teeth being formed with one radial face and one angled face;
a ring mounted in said recess and extending beyond the wall of said cylindrical nut;
a substantially hexagon shaped disc-like housing removably fitting over said toothed head and rotating on said cylindrical nut, said housing engaging and supported by said ring;
pins mounted in diametrically opposite corners of said hexagon shaped housing;
U-shaped spring members, including a pair of straight legs diverging from an inter-connecting bend portion, supported by said pins, one of the legs of said spring members engaging the side of said hexagon housing, the other leg of the U-shaped spring member extending at an angle, which is less than the angled face of a tooth relative to a diametrical line passing through said pins and through the radial faces of diametrically opposite teeth into the path of the nut, said other leg abutting the radial face of a tooth, the length of said other leg being adapted to be brought into frictional contact with the angled face of a tooth upon movement of the hexagon housing in a direction to thread the nut onto the bolt, and upon rotation of the housing in the other direction the abutting end of the leg of the spring member is urged against the radial face of a tooth, the angled face serving as a brace against the length of the leg to maintain the leg of the spring member in a substantially rigid extended position;
whereby threading the nut onto the bolt is accomplished through rotation of the hexagon housing on the nut, the frictional engagement of the leg of the spring member with the angled face of a tooth rotating the nut, the leg slipping over said angled face of a tooth when the torque necessary to tighten the nut is greater than the frictional force between the leg of the spring member and the angled face of the tooth, removal of the nut being accomplished through a force applied, by rotation of the hexagon head, through the pin and along the leg of the spring member and the abutting contact with the radial face of a tooth, the contact of the length of the leg of the spring member with the angled face of a tooth serving to prevent buckling of the leg of the spring member.

References Cited by the Examiner
UNITED STATES PATENTS 1,395,592 11/1921 Odom _____ 85—61
2,685,812 8/1954 Dmitroff _____ 85—61

CARL W. TOMLIN, *Primary Examiner.*

R. S. BRITTS, *Assistant Examiner.*